United States Patent [19]

Saenger et al.

[11] Patent Number: 5,016,254
[45] Date of Patent: May 14, 1991

[54] LASER-ACTIVE MEDIUM AND PROCESS FOR PRODUCING SAME

[75] Inventors: Georg Saenger, Voorschoten; Gerrit Hietkamp, Otterlo, both of Netherlands

[73] Assignee: Deutsche Forschungsanstalt fuer Luft- und Raumfahrt e.V., Fed. Rep. of Germany

[21] Appl. No.: 523,798

[22] Filed: May 15, 1990

[30] Foreign Application Priority Data

May 17, 1989 [DE] Fed. Rep. of Germany ....... 3916094

[51] Int. Cl.$^5$ .............................................. H01S 3/223
[52] U.S. Cl. ...................................... 372/55; 372/34; 372/37
[58] Field of Search ...................... 372/55, 51, 34, 37, 372/39

[56] References Cited

U.S. PATENT DOCUMENTS 3,605,038  9/1971  Byrne ................................... 372/55
4,580,268  4/1986  Barr, Jr. et al. ..................... 372/55

Primary Examiner—Frank Gonzalez
Assistant Examiner—Susan S. Morse
Attorney, Agent, or Firm—Barry R. Lipsitz

[57] ABSTRACT

To produce a medium for the emission of coherent radiation, i.e., a laser-active medium, using a complex of metastable helium and ammonia, it is proposed that it comprise a complex of metastable helium and ammonia as well as a radiation-active component, that the complex and the radiation-active component both be in the condensed, solid phase, and that the complex be present in the laser-active medium in condensed form with its dipole moment aligned substantially in one direction.

26 Claims, 3 Drawing Sheets

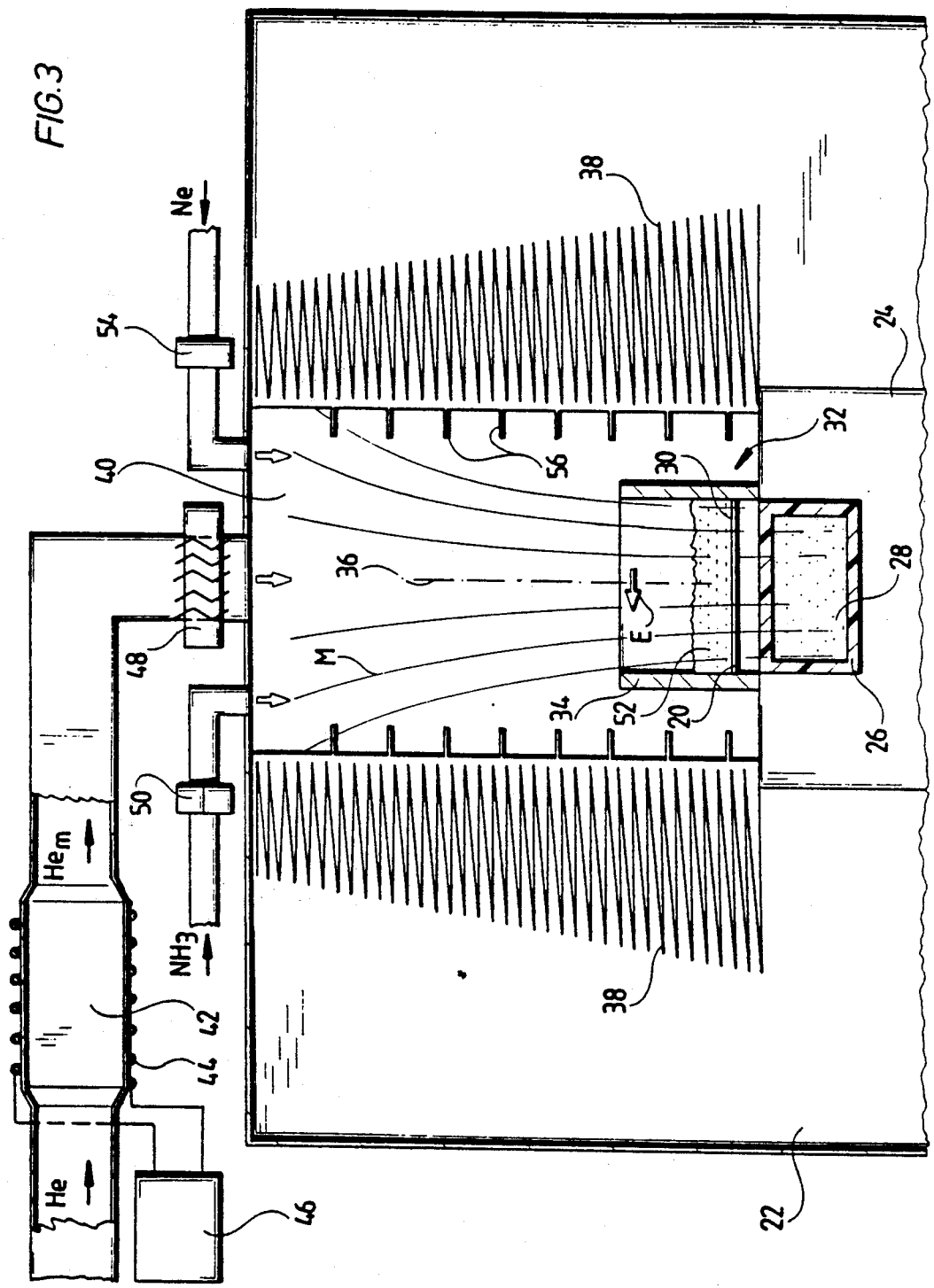

LASER-ACTIVE MEDIUM AND PROCESS FOR PRODUCING SAME

BACKGROUND OF THE INVENTION

The invention relates to a laser-active medium and to a process for producing same.

It is known from German published patent application 33 10 628 to use metastable helium for energy storage by forming a complex of metastable helium and ammonia. So far, however, it has only been possible for the energy stored in this way to be activated as thermal energy. It can, for example, be conceived of to use this complex as rocket fuel wherein the energy density would then be approximately 20 kcal/g and six times higher than in the conventional rocket fuel consisting of liquid hydrogen and oxygen.

It would, however, be much more advantageous if the energy stored with a high density could be made available in the form of coherent radiation.

SUMMARY OF THE INVENTION

The object underlying the invention is, therefore, to produce a medium for the emission of coherent radiation, i.e., a laser-active medium, using the known complex of metastable helium and ammonia.

This object is accomplished in accordance with the invention in that the laser-active medium comprises a complex of metastable helium and ammonia as well as a radiation-active component, in that the complex and the radiation-active component are both in the condensed, solid phase, and in that the complex is present in the laser-active medium in condensed form with its dipole moment aligned in one direction.

The advantage of such a laser-active medium is that it can store energy with a high energy density. In addition, it offers the possibility of regaining this energy in the form of coherent radiation. Such a laseractive medium is suited, in particular, for manufacture of a pulse laser.

The laser activity of this laser-active medium can be excited by the electron captured by the ammonia being excited by electromagnetic waves to the extent that it leaves its potential well in the order of magnitude of from 0.2 to 0.3 eV and hence the helium is present in the metastable state. The probability of transfer of energy from the helium to the neon is substantially higher when both atoms are present alongside one another in the condensed phase than in the gas phase and so a very rapid transfer of energy to the neon takes place, this being quicker by approximately the factor of 100 than transfer of energy to the ammonia, which would result in disintegration of the ammonia. In this case, the transfer of energy takes place in analogy with the helium-neon laser, but considerably more efficiently owing to the condensed phase. In addition, the alignment of the complexes of metastable helium and ammonia in the electric field results in the interaction between these being very intensive and hence a cascade effect can be very easily achieved during disintegration of such a complex as the radiation which preferably propagates perpendicularly to the dipole moment of the complex is then capable of likewise activating all of the other complexes.

It is particularly expedient within the scope of the inventive solution for the complex and the radiation-active component to be arranged in successive layers in the laser-active medium.

Alternatively, it is similarly conceivable for the complex and the radiation-active component to be intermixed at random in the laser-active medium.

Favorable ratios between the complexes and the radiationactive component should be maintained to ensure that the metastable helium can transfer its energy to the radiation-active component very effectively. For this reason, provision is expediently made for the ratio of the complex to the radiation-active component to be less than or equal to 1:1, i.e., for the number of atoms or molecules of the radiation-active component to be at least equal to or greater than the number of complexes.

In addition, the concentration of the complex in the condensate should, however, not be too low. For this reason, provision is expediently made for the ratio of the complex to the radiation-active component to be greater than or equal to 1:7, i.e., for the number of atoms or molecules forming the radiation-active component to be at most seven times the number of complexes.

All possible kinds of atoms or molecules are conceivable for the radiation-active component, but their energy level should preferably be such as to facilitate transfer of the energy from the metastable helium to this atom or molecule. For this reason, it has proven particularly advantageous for the radiation-active component to be neon. Further advantageous components are argon and molecular nitrogen $N_2$.

As stated at the beginning, the temperature of the laser-active medium is to be so low that both the complex and the radiation-active component are present in the condensed state. It is particularly advantageous for the temperature of the laser-active medium to lie below approximately 15 degrees K.

It is even more advantageous for the temperature of the laser-active medium to lie below approximately 10 degrees K, with temperatures of the laser-active medium corresponding approximately to that of liquid helium being preferred.

To stabilize the laser-active medium during storage, it has proven expedient for the laser-active medium to be arranged in a magnetic field, and when laser activity of this laser-active medium is desired, this magnetic field can be switched off or used to control the cascade effect.

It has proven expedient for the alignment of the magnetic field to be approximately perpendicular to the direction of the electric dipole moments of the complex.

In addition to production of a laser-active medium using the complex of metastable helium and ammonia, a further object underlying the invention is to provide a process for the production of such a laser-active medium, in particular with the features mentioned hereinabove.

This object is accomplished in accordance with the invention in that metastable helium is produced from helium gas, in that the metastable helium is intermixed with ammonia in the gas phase to form the complex, in that the electric dipole moment of the complex is aligned in an electric field, in that the complex with its aligned dipole moment is condensed on a condensation surface kept at a low temperature to build up a laser-active layer of condensate, and in that during the build-up of the laser-active layer of condensate, in addition to the complex of metastable helium and ammonia, a radiation-active component is deposited in this layer of condensate.

The advantage of the inventive process is to be seen in the fact that it enables production of the laser-active medium according to the invention in a simple way and in a single process.

It has proven particularly advantageous for the radiation-active component to be introduced in gaseous form.

The condensation may take place in different ways. In an advantageous variant, the condensation of the complex and of the radiation-active component is carried out in alternating, successive layers. In another advantageous embodiment, the complex and the radiation-active component are condensed in intermixed form.

The temperature at which condensation is to take place is already predetermined by the fact that the complex and the radiation-active component are to condense. It is particularly advantageous for the condensation to be carried out at a temperature below 15 degrees K. It is, however, even more advantageous for the condensation to be carried out at a temperature below 10 degrees K, with the temperature of the liquid helium being particularly preferred for condensation.

In order to stabilize the complex of metastable helium and ammonia during the condensation, provision is advantageously made for the condensation of the complex to take place in a magnetic field which aligns the spins of the metastable helium.

It is even better for the magnetic field to have a gradient which increases in the direction of the condensation surface as the complexes of metastable helium and ammonia can then travel along this gradient to the condensation surface and hence be captured.

As far as alignment of the magnetic field in relation to the electric field is concerned, it has proven advantageous for the magnetic field to be aligned approximately perpendicular to the electric field.

Several possibilities are conceivable for producing the metastable helium. Provision is, for example, made for the metastable helium to be produced by a discharge, preferably a high-frequency discharge.

To ensure during formation of the complex of metastable helium and ammonia that this complex remains stable, it is expedient for the metastable helium to be cooled down to a temperature below 150 degrees K before formation of the complex with ammonia. It is even better for the metastable helium to be cooled down to approximately the temperature of liquid nitrogen or below that.

In like manner, it is expedient for the ammonia to be cooled down to a temperature of 150 degrees K or less before formation of the complex with the metastable helium.

Regarding the ratio of the radiation-active component to the complex, one should similarly aim at favorable ratios in the condensate. For this reason, it is advantageous for the ratio of the complex to the radiation-active component to be less than or equal to 1:1. In addition, it is similarly advantageous for the ratio of the complex to the radiation-active component to be greater than or equal to 1:7 so that the number of atoms or molecules of the radiation-active component is preferably as large as or at the most seven times larger than the number of complexes in the condensate.

BRIEF DESCRIPTION OF THE DRAWINGS

Further features and advantages of the invention are apparent from the following description of the laser-active medium and the inventive process. The drawings show:

FIG. 3 a schematic illustration of an apparatus and the process for producing the laser-active medium according to the invention.

DESCRIPTION OF THE PREFERRED EMBODIMENTS

Figure 1:
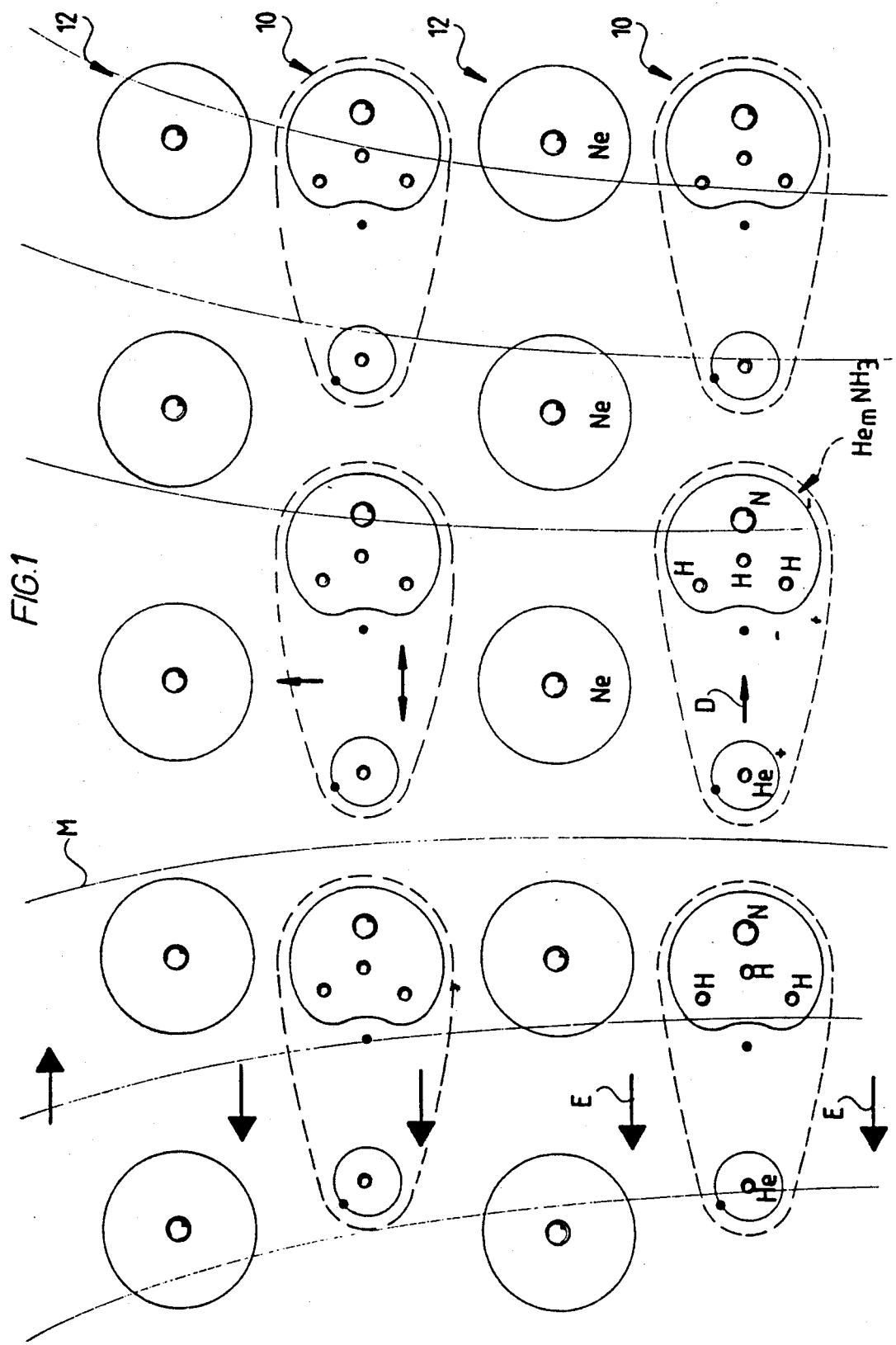
FIG. 1 a schematic illustration of a cross-section through a first embodiment of the laser-active medium according to the invention.

In a first embodiment, the laser-active medium according to the invention is built up such that layers 10 consisting of complexes of metastable helium $He_m$ in the triplet state ($2^3S_1$) and ammonia $NH_3$ alternate with layers 12 of neon atoms. These layers do not have to be built up exclusively of single layers, as shown in FIG. 1, but may also be built up of several layers of complexes or of neon atoms. The helium-ammonia complex is known as such and described, for example, in German patent application P 33 10 628.2. In this complex of metastable helium and ammonia, one electron of the helium is transferred to the ammonia molecule so the helium then only has one S-electron with a spin of $\frac{1}{2}$, while the other electron is held captured in excess by the ammonia. The energy for capture of the electron by the ammonia is approximately 0.2 to 0.3 eV and hence the electron is located in a potential well.

To enable recombination of the triplet state of the helium, the electron must, therefore, first be raised out of the potential well in which it is captured by the ammonia $NH_3$. A light quantum may, for example, be used for this purpose.

In the laser-active medium according to the invention, there is intensive interaction of the complexes owing to the alignment of the $He_mNH_3$ complexes with their dipole moment D parallel to the electric field E.

So long as the electron of the helium He is captured by the ammonia molecule $NH_3$ there is no interaction of the $He_mNH_3$ complexes with the neon Ne. Interaction with the neon occurs only after the electron has been raised out of the potential well. In this case, there is interaction of the now excited helium $He_m$ in the triplet state which is quicker by a factor of 100 with the neon Ne than with the ammonia molecule $NH_3$. A transfer of energy from the $He_m$ in the triplet state to the Ne then occurs in analogy with the helium-neon laser and so in the end the neon releases the desired laser radiation. The high probability of transfer of energy from the $He_m$ in the triplet state to the neon Ne in the case of the laser-active medium according to the invention is, in particular, also due to the fact that both are present as condensate, whereby the impact probability is substantially higher than in the gaseous phase with which one works in the case of the helium-neon laser.

A light quantum with an energy of approximately 0.3 eV is, therefore, sufficient to activate the $He_mNH_3$ complexes to the extent that energy is transferred from the $He_m$ to the Ne and hence in the end light is emitted by the Ne.

At the start of the laser activity, a magnetic field M which is advantageous and desirable for condensation of the laser-active layer and also for stabilization of the laser-active layer in the condensed state is preferably switched off. This magnetic field M may, however, also be used to control the speed at which the excited $He_m$ disintegrates as the magnetic field is capable of stabilizing the parallel alignment of the spins and hence of reducing the probability of disintegration.

Figure 2:
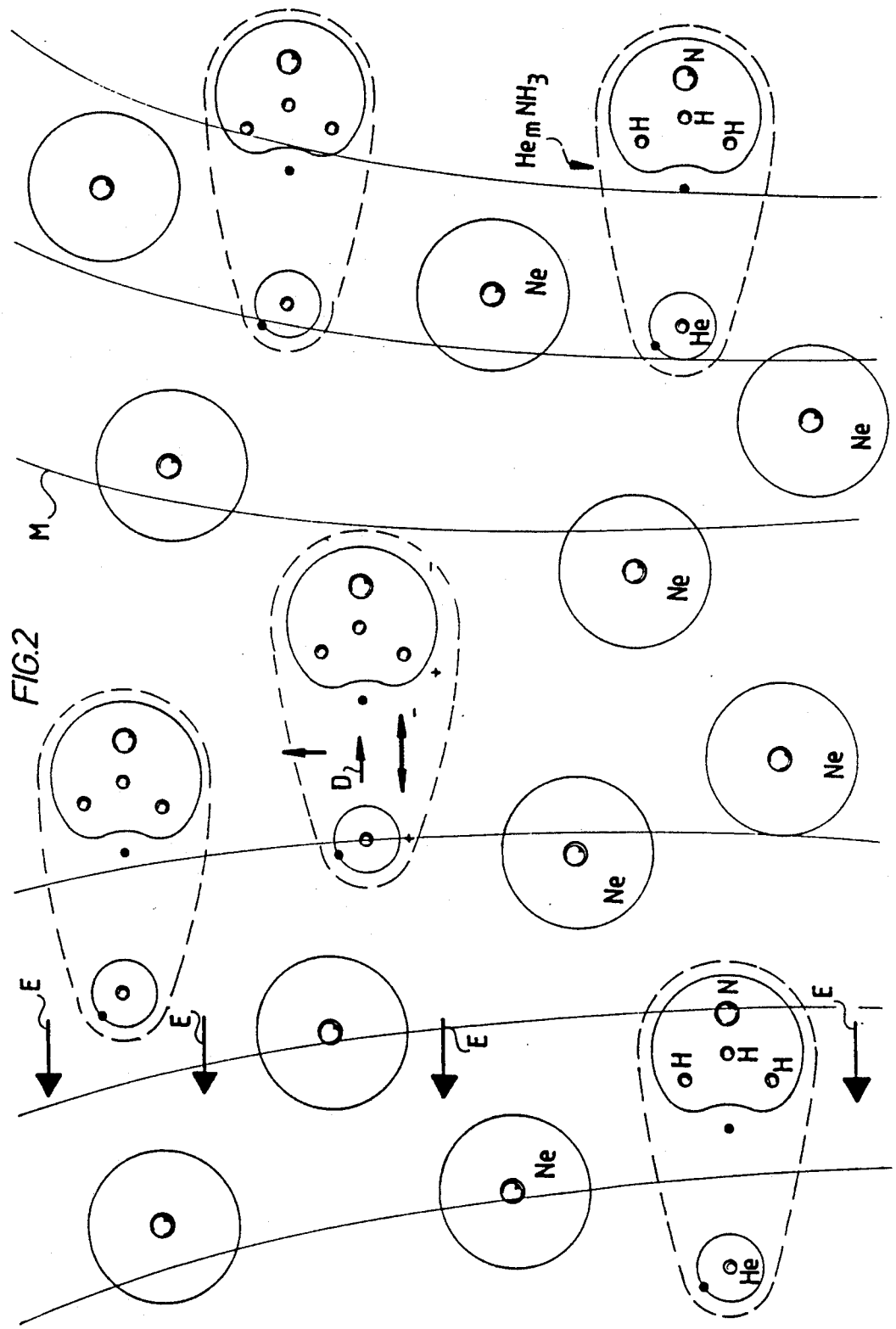
FIG. 2 an illustration similar to FIG. 1 of a second embodiment of the laser-active medium according to the invention.

A second embodiment of the laser-active medium according to the invention—illustrated in FIG. 2—differs from the first embodiment in that the $He_mNH_3$ complexes are not present in layers separate from the Ne atoms, but instead are distributed at random throughout the entire condensate. Aside from that, however, the $He_mNH_3$ complexes are likewise aligned with their dipole moments D parallel to the electric field E and so in the end the mechanism of the recombination for the laser activity is the same.

An apparatus—illustrated in FIG. 3—is provided for performance of the inventive process. This comprises a condensation plate 20 arranged in a vacuum in a vacuum container 22, with the vacuum preferably being approximately $10^{-3}$ mbar. The condensation plate 20 is held in the vacuum by a carrier 24. A cooling element 26 containing liquid helium as coolant is inserted in the carrier 24.

The cooling element 26 is thermally conductively connected to the condensation plate 20 and likewise keeps it at approximately the temperature of the liquid helium 28. A surface of the condensation plate 20 forms a condensation surface 30 for the laser-active medium to be applied.

A condenser means 32 is arranged at the sides of the condensation surface 30, thereby enclosing the latter. In the simplest case, the condenser means 32 comprises two plates 34 arranged in parallel spaced relation to each other, thereby enclosing the condensation surface 30. The plates 34 are aligned parallel to a surface normal 36 of the condensation surface 30. Hence an electric field E extending parallel to the condensation surface 30 is generated.

The condensation surface 30 is arranged in a magnetic field M, the field lines of which diverge from the condensation surface 30 in the direction of the surface normal 36, i.e., the magnetic field M decreases as the distance from the condensation surface 30 increases. This magnetic field M is generated by two coils 38 which are arranged symmetrically and opposite each other in relation to the surface normal, thereby likewise enclosing the condensation surface 30. They generate the magnetic field M which exhibits the maximum magnetic field strength in the region of the condensation surface 30 which is preferably approximately 10 tesla in this region and preferably decreases to approximately 8 tesla as the distance from the condensation surface 30 in the direction of the surface normal 36 increases.

Metastable helium $He_m$ is introduced into the space 40 enclosed by the coils 38 above the condensation surface 30 to produce the $He_mNH_3$ complex according to the invention. This takes place in the region of the weaker magnetic field M. The metastable helium $He_m$ is produced by blowing helium gas into a discharge space 42 which is surrounded by a high-frequency coil 44 which, in turn, communicates with a high-frequency generator 46. In the discharge space 42, the helium is thereby excited into the known triplet state ($2^3S_1$). This metastable helium now flows from the discharge space 42 into a cooling device 48 in which it is preferably cooled down to a temperature of less than 150 degrees K, in particular to a temperature in the range of the temperature of the liquid nitrogen.

The cooling device 48 is expediently designed so as to simultaneously form an optical shield from the discharge space 42 so the metastable helium $He_m$ flowing through it is shielded from optical radiation from the discharge space 42.

Ammonia $NH_3$ is then added to the metastable helium $He_m$ in the space 40 and its region exhibiting the weak magnetic field M. The ammonia is likewise cooled down by a cooling device 50 to a temperature of less than 150 degrees K, even better likewise to the temperature of liquid nitrogen. The metastable helium $He_m$ encountering the ammonia $NH_3$ now forms the $He_mNH_3$ complex as a result of the electron of the $He_m$ being captured by the $NH_3$. Owing to the positive gradient of the magnetic field, this complex travels into the region of the stronger magnetic field M and is finally condensed on the condensation surface 30.

Prior to the final condensing on the condensation surface 30, this complex passes through the electric field E prevailing above the condensation surface 30 and in the region thereof and so the complex is aligned parallel to the electric field E by its own diPole moment D. The electric field E is a strong electric field which must be selected such that it aligns the $He_mNH_3$ complexes passing through it with their dipole moments D in parallel before these condense on the condensation surface 30 so the majority of all $He_mNH_3$ complexes and preferably essentially all of these complexes are arranged in alignment in the condensate.

Depending on which embodiment of the laser-active medium according to the invention is to be produced, the radiation-active component neon Ne is introduced into the space 40 at the same time as the metastable helium $He_m$ and the ammonia $NH_3$ so it can condense on the condensation surface simultaneously with the $He_3NH_3$ complexes. The amount of neon Ne that is introduced is selected such that in the end the ratio of the $He_mNH_3$ complexes to the neon is approximately 1:2 through 7 in the condensate 52 forming on the condensation surface.

Alternatively, introduction of the neon can be carried out alternately with introduction of metastable helium $He_m$ and ammonia $NH_3$ so that either a layer 10 of the $He_mN_3$ complex or a layer 12 of neon forms in the condensate 52.

It is expedient for the neon to also be conducted through a cooling device 54 prior to introduction into the space 40 and to thereby be cooled down to a temperature of less than 150 degrees K, preferably in the range of the liquid nitrogen.

After it has been built up, the condensate is stored, preferably at a temperature of less than 15 degrees K, even better at less than 10 degrees K, and during storage the magnetic field M should remain switched on for additional stabilization of the $He_mNH_3$ complex.

The electric field E can be selectively maintained or switched off during storage of the condensate.

To incite the laser-active medium according to the invention, i.e., the condensate 52, to laser activity, it is expedient for the electric field E and the magnetic field M to be switched off.

Finally, in the production of the laser-active medium according to the invention, care must be taken to ensure that the $He_mNH_3$ complex once formed is shielded from all radiation influences. In particular, during performance of the inventive process shielding from the discharge space 42 is necessary. The entire space 40 is preferably shielded from electromagnetic radiation. In addition, it is expedient to provide on the sides of the coils 38 facing the space 40 screens 56 which extend approximately parallel to the condensation surface to prevent, for example, complexes diffusing at the sides in the direction of the coils from being excited by contact with the coil walls to the extent that the electron captured by the ammonia $NH_3$ can leave its potential well and the metastable helium $He_m$ disintegrates, for example, to interact with the neon, with radiation thereby being emitted by the neon. This radiation could prove sufficient to trigger a cascade reaction in the condensate 52.

The present disclosure relates to the subject matter disclosed in German application No. P 39 16 094.7-33 of May 17, 1989, the entire specification of which is incorporated herein by reference.

What is claimed is:

1. Laser-active medium, characterized in that it comprises a complex ($He_mNH_3$) of metastable helium and ammonia as well as a radiation-active component (Ne), in that said complex ($He_mNH_3$) and said radiation-active component (Ne) are both in the condensed, solid phase, and in that said complex ($He_mNH_3$) is present in said laser-active medium (52) in condensed form with its dipole moment (D) aligned substantially in one direction.

2. Laser-active medium as defined in claim 1, characterized in that said complex ($He_mNH_3$) and said radiation-active component (Ne) are arranged in successive layers (10, 12) in said laser-active medium (52).

3. Laser-active medium as defined in claim 1, characterized in that said complex ($He_mNH_3$) and said radiation-active component (Ne) are intermixed at random in said laser-active medium (52).

4. Laser-active medium as defined in claim 1, characterized in that the ratio of said complex ($He_mNH_3$) to said radiation-active component (Ne) is less than or equal to 1:1.

5. Laser-active medium as defined in claim 4, characterized in that the ratio of said complex ($He_mNH_3$) to said radiation-active component (Ne) is greater than or equal to 1:7.

6. Laser-active medium as defined in claim 1, characterized in that said radiation-active component is neon (Ne).

7. Laser-active medium as defined in claim 1, characterized in that the temperature of said laser-active medium (52) lies below approximately 15 degrees K.

8. Laser-active medium as defined in claim 7, characterized in that the temperature of said laser-active medium (52) lies below approximately 10 degrees K.

9. Laser-active medium as defined in claim 8, characterized in that the temperature of said laser-active medium (52) corresponds approximately to that of liquid helium.

10. Laser-active medium as defined in claim 1, characterized in that said laser-active medium (52) is arranged in a magnetic field (M).

11. Laser-active medium as defined in claim 8, characterized in that said magnetic field (M) is aligned approximately perpendicular to the direction of said electric dipole moments (D).

12. Process for the production of a laser-active medium, characterized in that metastable helium is produced from helium gas, in that said metastable helium is intermixed with ammonia in the gas phase to form a complex, in that the electric dipole moment of said complex is aligned in an electric field, in that said complex with its aligned dipole moment is condensed on a condensation surface kept at a low temperature to build up a laser-active layer of condensate, and in that during the build-up of said laser-active layer of condensate, in addition to said complex of metastable helium and ammonia, a radiation-active component is deposited in said layer of condensate.

13. Process as defined in claim 12, characterized in that said radiation-active component is added in gaseous form and condensed.

14. Process as defined in claim 12, characterized in that the condensation of said complex and of said radiation-active component is carried out in alternating, successive layers.

15. Process as defined in claim 12, characterized in that said complex and said radiation-active component are condensed in intermixed form.

16. Process as defined in claim 12, characterized in that the condensation of said complex and of said radiation-active component is carried out at a temperature below 15 degrees K.

17. Process as defined in claim 16, characterized in that the condensation of said complex and of said radiation-active component is carried out at a temperature below 10 degrees K.

18. Process as defined in claim 17, characterized in that the condensation of said complex and of said radiation-active component is carried out at approximately the temperature of liquid helium.

19. Process as defined in claim 12, characterized in that the condensation of said complex takes place in a magnetic field which aligns the spins of said metastable helium.

20. Process as defined in claim 19, characterized in that said magnetic field has a gradient which increases in the direction of said condensation surface.

21. Process as defined in claim 19, characterized in that said magnetic field is aligned approximately perpendicular to said electric field.

22. Process as defined in claim 12, characterized in that said metastable helium is cooled down to a temperature below 150 degrees K prior to formation of the complex with ammonia.

23. Process as defined in claim 22, characterized in that said metastable helium is cooled down to approximately the temperature of liquid nitrogen or below that.

24. Process as defined in claim 12, characterized in that said ammonia is cooled down to a temperature of approximately 150 degrees K or less prior to formation of the complex with said metastable helium.

25. Process as defined in claim 12, characterized in that the ratio of said complex to said radiation-active component is less than or equal to 1:1.

26. Process as defined in claim 25, characterized in that the ratio of said complex to said radiation-active component is greater than or equal to 1:7.

* * * * *